United States Patent
Mandal

(10) Patent No.: US 9,917,924 B2
(45) Date of Patent: Mar. 13, 2018

(54) METHODS, SYSTEMS, AND COMPUTER READABLE MEDIA FOR SIMPLISTIC VISUAL REPRESENTATION OF COMPLEX INTERDEPENDENT NETWORK PROTOCOL FIELDS FOR NETWORK PROTOCOL FUZZING AND GRAPHICAL FRAMEWORK FOR REPORTING INSTANTANEOUS SYSTEM LEVEL PROGRESS

(71) Applicant: Ixia, Calabasas, CA (US)

(72) Inventor: Kingshuk Mandal, Kolkata (IN)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 357 days.

(21) Appl. No.: 14/658,860

(22) Filed: Mar. 16, 2015

(65) Prior Publication Data
US 2016/0277541 A1    Sep. 22, 2016

(51) Int. Cl.
*H04L 29/06* (2006.01)
*H04L 12/24* (2006.01)
(Continued)

(52) U.S. Cl.
CPC .............. *H04L 69/02* (2013.01); *H04L 41/22* (2013.01); *H04L 43/50* (2013.01); *H04L 69/16* (2013.01);
(Continued)

(58) Field of Classification Search
CPC ....... G06F 21/577; H04L 41/22; H04L 43/50; H04L 69/16; H04L 69/22
See application file for complete search history.

(56) References Cited

U.S. PATENT DOCUMENTS 5,822,520 A    10/1998  Parker
6,353,446 B1    3/2002  Vaughn et al.
(Continued)

FOREIGN PATENT DOCUMENTS

WO    WO 2013/087982 A1    6/2013
WO    WO 2013/192086 A1    12/2013
WO    WO 2015/171599 A1    11/2015

OTHER PUBLICATIONS

Anne MacFarland, Codenomicon Defensics Finds Risks that Lurk in Your Protocols, Aug. 16, 2007, The Clipper Group Navigator, Report #TCG2007081, pp. 1-3.*
(Continued)

*Primary Examiner* — William Bashore
*Assistant Examiner* — Daniel Parcher

(57) ABSTRACT

A method for visualizing interdependent network protocol fields for fuzzing and progress reporting includes providing a graphical user interface including a stacked representation of network protocol fields to be fuzzed. The method further includes displaying, in the stacked representation, an indication of network protocol fields that can or cannot be fuzzed. The method further includes receiving, via the stacked representation, selections of network protocol fields to be fuzzed and specifications of fuzzed parameter values for the selections. The method further includes generating and sending to a device under test network protocol packets with fuzzed parameter values according the selections and specifications.

21 Claims, 4 Drawing Sheets

(51) Int. Cl.
*H04L 12/26* (2006.01)
*G06F 21/57* (2013.01)

(52) U.S. Cl.
CPC ............ *H04L 69/22* (2013.01); *G06F 21/577* (2013.01); *H04L 41/0813* (2013.01); *H04L 41/0866* (2013.01)

(56) References Cited

U.S. PATENT DOCUMENTS

| | | | |
|---|---|---|---|
| 6,639,607 | B1 | 10/2003 | Ferguson et al. |
| 6,671,869 | B2 | 12/2003 | Davidson et al. |
| 6,707,474 | B1 | 3/2004 | Beck et al. |
| 6,757,742 | B1 | 6/2004 | Viswanath |
| 6,814,842 | B1 | 11/2004 | Yago et al. |
| 6,862,699 | B2 | 3/2005 | Nakashima et al. |
| 6,931,574 | B1 | 8/2005 | Coupal et al. |
| 6,941,551 | B1 | 9/2005 | Turkoglu |
| 6,988,208 | B2 | 1/2006 | Hrabik et al. |
| 7,047,297 | B2 | 5/2006 | Huntington et al. |
| 7,278,061 | B2 | 10/2007 | Smith |
| 7,342,897 | B1 * | 3/2008 | Nader ............ H04L 43/00 370/241 |
| 7,735,141 | B1 | 6/2010 | Noel et al. |
| 7,818,788 | B2 | 10/2010 | Meier |
| 7,926,114 | B2 | 4/2011 | Neystadt et al. |
| 8,046,720 | B2 | 10/2011 | Wirth |
| 8,407,798 | B1 | 3/2013 | Lotem et al. |
| 8,745,592 | B1 | 6/2014 | Ormandy et al. |
| 8,819,834 | B2 | 8/2014 | Petrica et al. |
| 9,432,394 | B1 | 8/2016 | Lahiri et al. |
| 9,497,100 | B2 | 11/2016 | Chakrabarti et al. |
| 2002/0186697 | A1 | 12/2002 | Thakkar |
| 2002/0198985 | A1 | 12/2002 | Fraenkel et al. |
| 2003/0014669 | A1 | 1/2003 | Caceres et al. |
| 2003/0036896 | A1 | 2/2003 | Skingsley et al. |
| 2003/0131098 | A1 | 7/2003 | Huntington et al. |
| 2003/0145039 | A1 | 7/2003 | Bonney et al. |
| 2003/0172177 | A1 | 9/2003 | Kersley et al. |
| 2004/0025015 | A1 | 2/2004 | Satterlee et al. |
| 2004/0068681 | A1 | 4/2004 | Smith |
| 2004/0250124 | A1 | 12/2004 | Chesla et al. |
| 2005/0235263 | A1 | 10/2005 | Bundy et al. |
| 2007/0006041 | A1 | 1/2007 | Brunswig et al. |
| 2007/0192863 | A1 | 8/2007 | Kapoor et al. |
| 2008/0095102 | A1 | 4/2008 | Meng et al. |
| 2008/0262990 | A1 | 10/2008 | Kapoor et al. |
| 2008/0288822 | A1 | 11/2008 | Wu et al. |
| 2008/0301647 | A1 | 12/2008 | Neystadt et al. |
| 2008/0301813 | A1 | 12/2008 | Neystadt et al. |
| 2008/0320328 | A1 | 12/2008 | O'Leary |
| 2009/0077666 | A1 | 3/2009 | Chen et al. |
| 2009/0083854 | A1 | 3/2009 | Bozanich et al. |
| 2009/0204591 | A1 * | 8/2009 | Kaksonen ............ G06F 11/3684 |
| 2009/0252046 | A1 | 10/2009 | Canright et al. |
| 2009/0327943 | A1 | 12/2009 | Medvedev et al. |
| 2009/0328190 | A1 | 12/2009 | Liu et al. |
| 2010/0058475 | A1 | 3/2010 | Thummalapenta et al. |
| 2010/0100871 | A1 | 4/2010 | Celeskey et al. |
| 2011/0078798 | A1 | 3/2011 | Chen et al. |
| 2011/0214157 | A1 | 9/2011 | Korsunsky et al. |
| 2011/0302455 | A1 | 12/2011 | Thomas et al. |
| 2012/0084756 | A1 | 4/2012 | Subramanian et al. |
| 2012/0089868 | A1 | 4/2012 | Meijer et al. |
| 2013/0259370 | A1 | 10/2013 | Tang |
| 2013/0340083 | A1 | 12/2013 | Petrica et al. |
| 2014/0047275 | A1 | 2/2014 | Eddington |
| 2015/0319072 | A1 | 11/2015 | Chakrabarti et al. |
| 2016/0277432 | A1 | 9/2016 | Lahiri et al. |

OTHER PUBLICATIONS

Codenomicon, Technical Deep Dive: Fuzzing Wifi, Dec. 17, 2012, Youtube.com, https://www.youtube.com/watch?v=ABAI2WmbNXU, pp. 1-5.*

Antunes, et al., Recycling Test Cases to Detect Security Vulnerabilities, 2012, IEEE, 23rd International Symposium on Software Reliability Engineering, pp. 231-240.*

Applicant-Initiated Interview Summary for U.S. Appl. No. 14/270,333 (dated Apr. 4, 2016).

Non-Final Office Action for U.S. Appl. No. 14/270,333 (dated Jan. 22, 2016).

Notification of Transmittal of the International Search Report and the Written Opinion of the International Searching Authority, or the Declaration for International Application No. PCT/US2015/029225 (dated Aug. 10, 2015).

Commonly-assigned, co-pending U.S. Appl. No. 14/659,309 for "Methods, Systems, and Computer Readable Media for Converging on Network Protocol Stack Vulnerabilities Using Fuzzing Variables, Vulnerability Ratings and Progressive Convergence," (Unpublished, filed Mar. 16, 2015).

Householder et al., "Probablity-Based Parameter Selection for Black-Box Fuzz Testing," Software Engineering Institute, Technical Note, CMU/SEI-2012-TN-019, 30 pgs. (Aug. 2012).

Commonly-assigned, co-pending U.S. Appl. No. 14/270,333 for "Methods, Systems, and Computer Readable Media for Providing Fuzz Testing Functionality," (Unpublished, filed May 5, 2014).

Notice of Allowance and Fee(s) Due for U.S. Appl. No. 13/527,565 (dated Apr. 25, 2014).

Final Office Action for U.S. Appl. No. 13/527,565 (dated Jan. 3, 2014).

"Wireshark," http://web.archive.org/web/20131231064122/http://en.wikipedia.org/wiki/Wireshark, pp. 1-6 (Dec. 2013).

Notification of Transmittal of the International Search Report and the Written Opinion of the International Searching Authority, or the Declaration for International Application No. PCT/US2013/046129 (Nov. 8, 2013).

Non-Final Office Action for U.S. Appl. No. 13/527,565 (dated Jul. 30, 2013).

"IxNetwork," http://www.ixiacom.com/products/ixnetwork, PN: 915-3003-01, Rev. B., pp. 1-4 (May 2011).

Gorbunov et al., "AutoFuzz: Automated Network Protocol Fuzzing Framework", International Journal of Computer Science and Network Security, vol. 10, No. 8, pp. 239-245 (Aug. 2010).

Abdelnur et al., "KiF: A stateful SIP Fuzzer", Proceedings of the 1st international conference on Principles, systems and applications of IP telecommunications, pp. 47-56 (2007).

Banks et al., "SNOOZE: Toward a Stateful NetwOrk prOtocol FuZZEr", Information Security, pp. 343-358 (2006).

Allen et al., "A Model-based Approach to the Security Testing of Network Protocol Implementations," IEEE, Department of Computer Sciences, Florida Institute of Technology, pp. 1-8 (Copyright 2006).

Screenshot of antiparser, antiparser.sourceforge.net (Aug. 17, 2005).

Aitel, "An Introduction to SPIKE, the Fuzzer Creation Kit", Immunity Inc., White Paper, pp. 1-32 (2004).

Screenshot of Autodafé, an Act of Software Torture, autodafe.sourceforge.net (Copyright 2004-2006).

Wieser et al., "Security testing of SIP implementations", Technical Report, Columbia University, Department of Computer Science, pp. 1-7 (2003).

Amini et al., "Sulley: Fuzzing Framework", www.fuzzing.org/wp-content/SulleyManual.pdf (Publication Date Unknown).

Screenshot of VDA Labs, www.vdalabs.com/tools/efs_gpf.html (Publication Date Unknown).

Screenshot of Peach Fuzzing Platform, peachfuzzer.com (Publication Date Unknown, downloaded from the Internet Aug. 17, 2012).

Notice of Allowance and Fee(s) Due for U.S. Appl. No. 10/316,445 (dated Jun. 9, 2011).

Notice of Panel Decision from Pre-Appeal Brief Review for U.S. Appl. No. 10/316,445 (dated Mar. 25, 2011).

Non-Final Official Action for U.S. Appl. No. 10/316,445 (dated Jan. 4, 2010).

Final Official Action for U.S. Appl. No. 10/316,445 (dated Jul. 9, 2009).

Non-Final Official Action for U.S. Appl. No. 10/316,445 (dated Dec. 26, 2008).

(56) References Cited

OTHER PUBLICATIONS

Final Official Action for U.S. Appl. No. 10/316,445 (dated Jul. 9, 2008).
Non-Final Official Action for U.S. Appl. No. 10/316,445 (dated Dec. 27, 2007).
Screenshot of Ixia PDU Builder Main Screen, p. 1 (May 28, 2002).
Comer, "Internetworking with TCP/IP, vol. 1: Principles, Protocols, and Architecture," Third Edition, pp. 203-204, (1995).
Communication of European publication number and information on the application of Article 67(3) EPC for European Application No. 15788981.7 (dated Feb. 15, 2017).
Notice of Allowance and Fee(s) Due and AFCP 2.0 Decision for U.S. Appl. No. 14/270,333 (dated Jul. 13, 2016).
Applicant-Initiated Interview Summary for U.S. Appl. No. 14/270,333 (dated Jun. 20, 2016).
Notice of Allowance and Fee(s) Due and Examiner-Initiated Interview Summary for U.S. Appl. No. 14/659,309 (dated Apr. 29, 2016).
Final Office Action for U.S. Appl. No. 14/270,333 (dated Apr. 25, 2016).

\* cited by examiner

METHODS, SYSTEMS, AND COMPUTER READABLE MEDIA FOR SIMPLISTIC VISUAL REPRESENTATION OF COMPLEX INTERDEPENDENT NETWORK PROTOCOL FIELDS FOR NETWORK PROTOCOL FUZZING AND GRAPHICAL FRAMEWORK FOR REPORTING INSTANTANEOUS SYSTEM LEVEL PROGRESS

TECHNICAL FIELD

The subject matter described herein relates to network protocol fuzzing. More particularly, the subject matter described herein relates to methods, systems, and computer readable media for simplistic visual representation of complex interdependent network protocol fields for network protocol fuzzing and graphical framework for reporting instantaneous system level progress.

BACKGROUND

In the field of networking and telecommunications, fuzzing is a testing technique used to discover security loopholes in software, operating systems, or in networks, primarily due to coding errors. Fuzzing tools, also referred to as fuzzers, perform this testing by generating massive amounts of random data or interdependent data patterns (referred to as fuzz) and bombard the system under test in an attempt to make it malfunction, stop functioning completely, or crash. The objective of fuzzing tools is to detect situations where the system under test malfunctions on receipt of specific fuzzed data so that vulnerabilities can be identified and corrected.

Network communications protocols that are tested using fuzzing are complex and continually evolving. The roles and responsibility of a networking entity or a node has been divided into multiple layers, which has been conceptualized in the open systems interconnect (OSI) 7-layer network communications protocol architecture. A complete network packet includes multiple segments, one for each of the layers. This makes the packet large and complex. In addition, protocol fields in one layer are logically related to one or more fields in other layers. When a packet needs to be fuzzed, the multiple fields of the packets need to be configured for fuzzing. The fields may belong to different segments or layers. It is very difficult to configure the set of fields just by picking them by name, as their positional relationship with respect to each other must be known to the test engineer. In addition, the test engineer must know the relationships between fields being fuzzed. As the number of fields to be fuzzed increases, the complexity of fuzz testing increases. Moreover, if it is desirable to do stateful fuzzing, the importance of knowing the interdependency between packet fields to be fuzzed increases. For example, because of this interdependency, it may not be possible to fuzz some fields.

Accordingly, in light of these difficulties, there exists a need for methods, systems, and computer readable media for simplistic visual representation of complex interdependent network protocol fields for network protocol fuzzing and graphical framework for reporting instantaneous system level progress.

SUMMARY

The subject matter described herein includes methods, systems, and computer readable media for simplistic visual representation of complex interdependent network protocol fields for network protocol fuzzing and graphical framework for reporting instantaneous system level progress. One method includes providing a graphical user interface including a stacked representation of network protocol fields to be fuzzed. The method further includes, displaying in the stacked representation an indication of network protocol fields that can or cannot be fuzzed. The method further includes receiving, via the stacked representation, selections of network protocol fields to be fuzzed and specifications of fuzzed parameter values for the selections. The method further includes generating and sending to a device under test network protocol packets with fuzzed parameter values according the selections and specifications.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
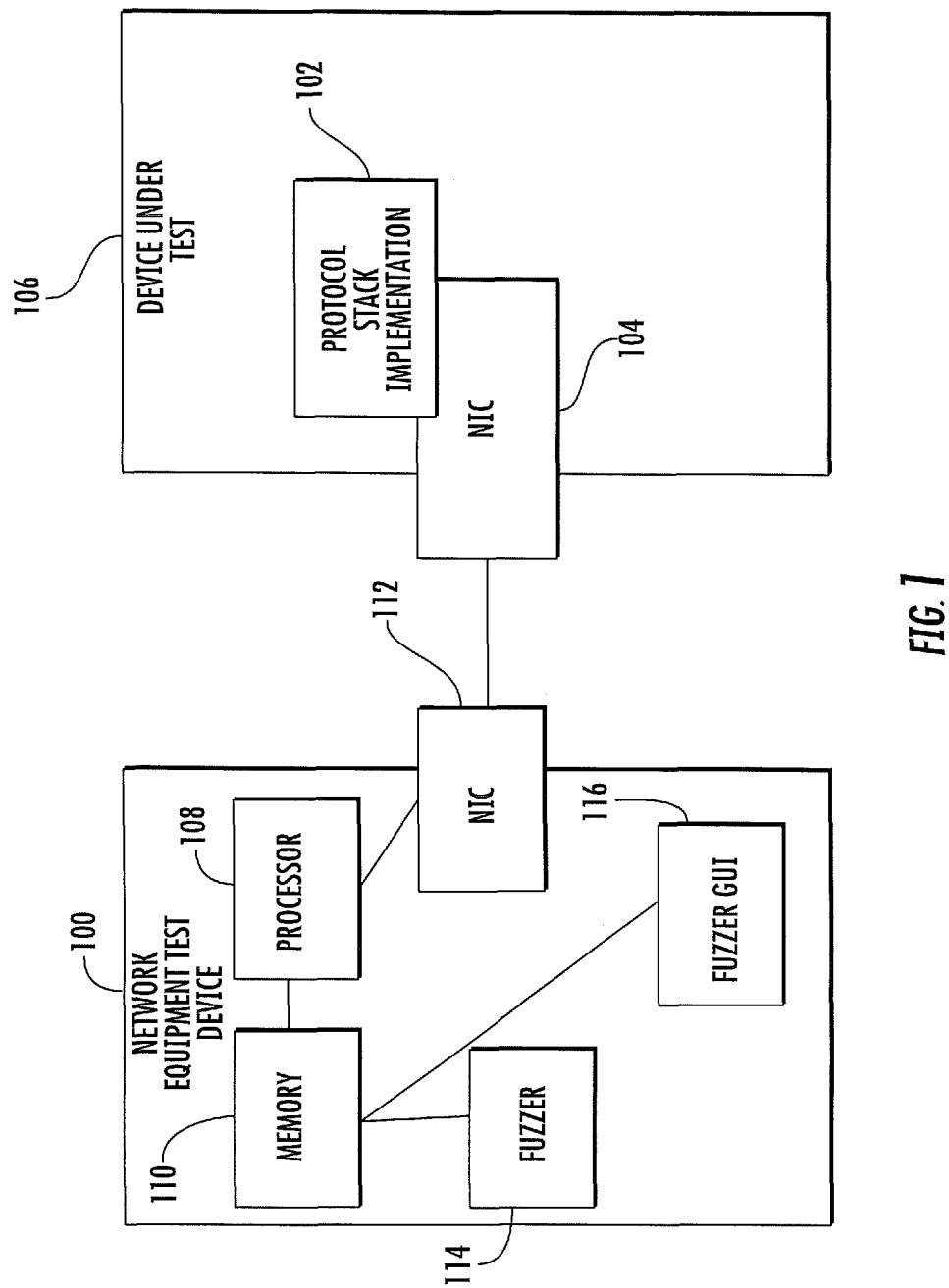
FIG. 1 is a block diagram illustrating an exemplary system for fuzzing using a stacked representation of network protocol fields according to an embodiment of the subject described herein.

The subject matter described herein includes methods, systems, and computer readable media for simplistic visual representation of complex interdependent network protocol fields for network protocol fuzzing and graphical framework for reporting instantaneous system level progress. FIG. 1 is a diagram illustrating an exemplary system for network communications protocol fuzzing using a stacked representation of network protocol fields according to an embodiment of the subject matter described herein. Referring to FIG. 1, network equipment test device 100 may perform fuzz testing of a network protocol stack implementation 102 that resides on the network processor of a network interface card 104 and/or on another processor of a device under test 106. Network equipment test device 100 includes a processor 108, a memory 110, and one or more network interface cards 112. Network equipment test device 100 further includes a fuzzer 114 and a fuzzer GUI 116. Fuzzer 114 may be executed by processor 108 to send fuzzed packets to device under test 106 to test the functionality of protocol stack implementation 102. Fuzzer GUI 116 displays a stacked representation of network protocol fields to be fuzzed, where the stacked representation indicates fields that can or cannot be fuzzed, the progress of fuzzing of a particular protocol layer, and whether fuzzing has or has not been enabled for a particular protocol field.

Once the user completes selection of protocol fields to be fuzzed and how the fields will be fuzzed and initiates a test, fuzzer 114 may create the fuzzed test packets and transmit the test packets to device under test 106. Fuzzer 114 may monitor the response of device under test 106 to the fuzzed data packets and report results of the testing to the user.

Figure 2:
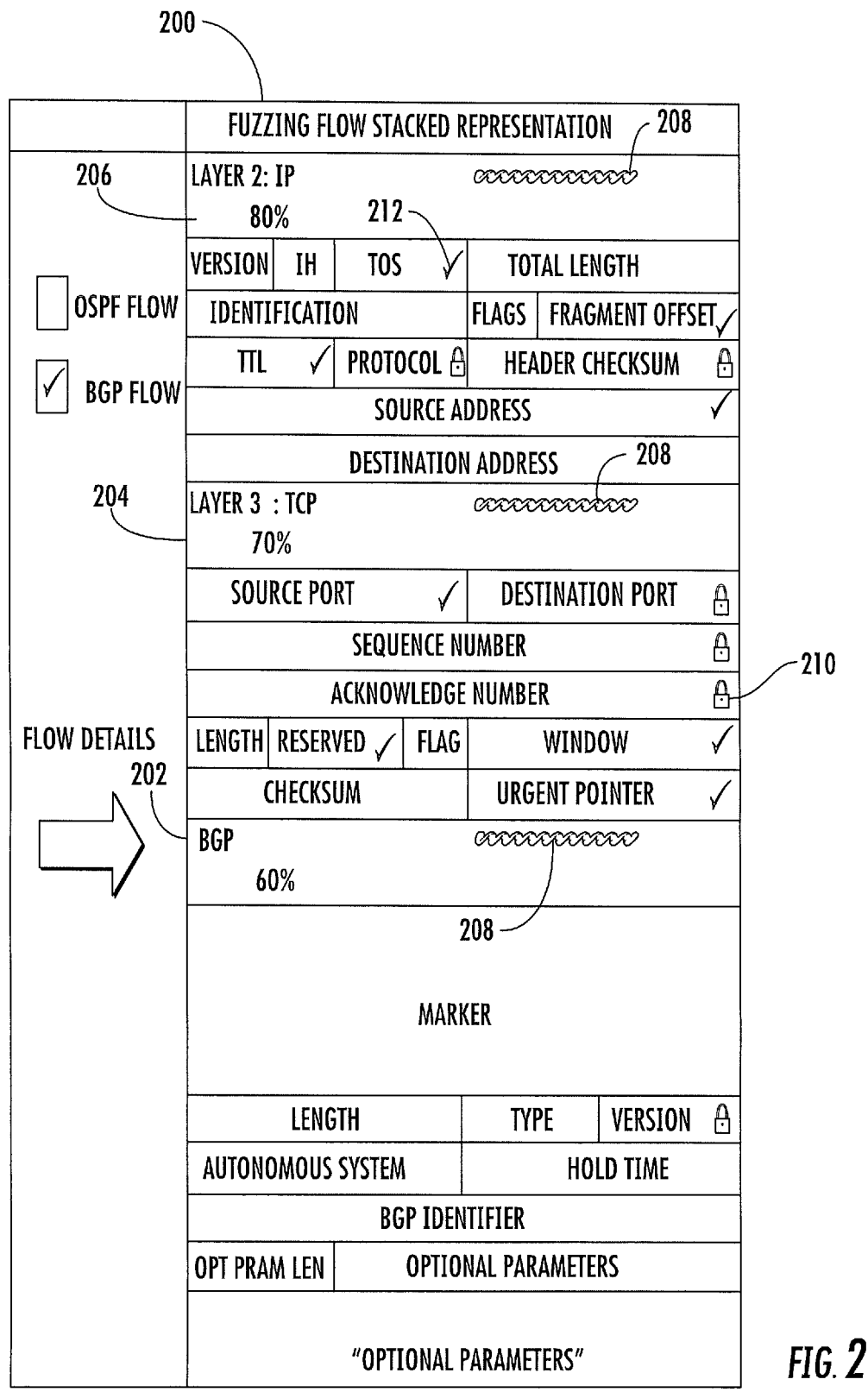
FIG. 2 is a diagram illustrating a stacked representation of network protocol fields for facilitating fuzzing of the protocol fields according to an alternate embodiment of the subject matter described herein.

FIG. 2 is a diagram illustrating an exemplary stacked representation of network protocol fields that may be displayed by fuzzer GUI 116. Referring to FIG. 2, stacked representation 200 is a two-dimensional representation of protocol fields of different OSI protocol layers that are stacked of each other. In the illustrated example, the fields are shown for generating a flow of border gateway protocol (BGP) packets. Because BGP runs on top of transmission control protocol/Internet protocol (TCP/IP), Stacked representation 200 includes a BGP layer indicator 202, a transmission control protocol (TCP) layer indicator 204, and an Internet protocol (IP) layer indicator 206. For each layer, stacked representation 200 displays a fuzzing progress indicator 208 indicates the progress of fuzzing for the protocol layer. For example, fuzzing progress indicator 208 displayed in IP layer indicator 206 indicates that fuzzing of the IP layer is 80% complete, which means that fuzzing has been defined or enabled for 80% of portion of the IP layer that can be fuzzed.

Stacked representation 200 displays protocol fields such that their relative positional relationships are visually maintained. For example the position of each protocol field in each layer corresponds to the field's position in the protocol datagram header. In addition, the protocol layers are shown in the position in which they appear in a protocol packet. For example, since the representation in FIG. 2 shows network, transport, and application layers, the IP layer is stacked on top of the TCP layer, which is displayed on top of the BGP layer. The stacked representation in FIG. 2 is the reverse of the OSI layering because in FIG. 2, the IP layer (OSI layer 3) is shown on top of the TCP layer (OSI layer 4), which is shown on top of the BGP layer (OSI layer 5). However, as stated above, the stacked representation in FIG. 2 shows the outermost layer in an actual packet in the highest position. In a BGP packet, the IP header is the outermost header, the TCP header is the middle header, and the BGP header is the innermost header.

Stacked representation 200 further includes fuzzability indicators that indicate whether or not a protocol field can be fuzzed to maintain statefulness. In the illustrated example, the fuzzability indicators comprise lock indicators 210, which indicate protocol fields that cannot be fuzzed to maintain statefulness. A field without a lock indicator 210 is fuzzable. In an alternate implementation, fuzzability indicators may include positive fuzzability indicators that indicate protocol fields that can be fuzzed in addition to or instead of lock indicators 210.

Stacked representation 200 further includes per-field fuzzing status indicators that indicate whether or not fuzzed parameter values have been defined for a given field. In the illustrated example, the per-field fuzzing status indicators comprise checks 212, which, if displayed in a protocol field, indicate that the fuzzing parameters for the field have been defined. The absence of a check 212 indicates that the field has not been fuzzed. In an alternate implementation, the per-field fuzzing status indicators may include Xes or other parameters that indicate that a protocol field has not been fuzzed in addition to or instead of checks 212.

The representation illustrated in FIG. 2 visually indicates the tightly coupled interdependency of the fields. The representation ensures correctness of the configuration (by illustrating the entire system graphically as opposed to remembering field names and their relationships) and significantly approves usability. For example, if a BGP flow needs to be fuzzed in a stateful manner (i.e., without killing the BGP session parameter), then one cannot fuzz fields like IP protocol, TCP port number, TCP sequence number, and BGP version, as doing so would violate the statefulness of BGP. Many other fields can be fuzzed at the same time in a packet. The stacked representation illustrated in FIG. 2 shows the tight coupling of fields graphically.

In addition, as stated above, the stacked representation reports fuzzing progress at each individual protocol layer and at the individual field level. Both the layer and field level progress indicators may be displayed and updated or nearly simultaneously as the user enables fuzzing for different protocol fields. Such a representation illustrates to the end user which part of the segment has made more progress and which fields need to remain static for stateful fuzzing.

Although the example illustrated in FIG. 2 shows a stacked representation of a BGP flow, the subject matter described herein is not limited to displaying a stacked representation of or fuzzing only packets in a BGP flow. In an alternate implementation, the BGP layer may be replaced by another layer, such as an open shortest path first (OSPF) layer and fields of the OSPF packet may be displayed in a stacked representation similar to that illustrated in FIG. 2. OSPF packets may be fuzzed in a similar manner to BGP packets, the fuzzing of which is described in detail below. Similarly, other protocol fields, such as layer 2 fields, may be displayed in a stacked representation as illustrated in FIG. 2 and fuzzed using the process described below.

Figure 3:
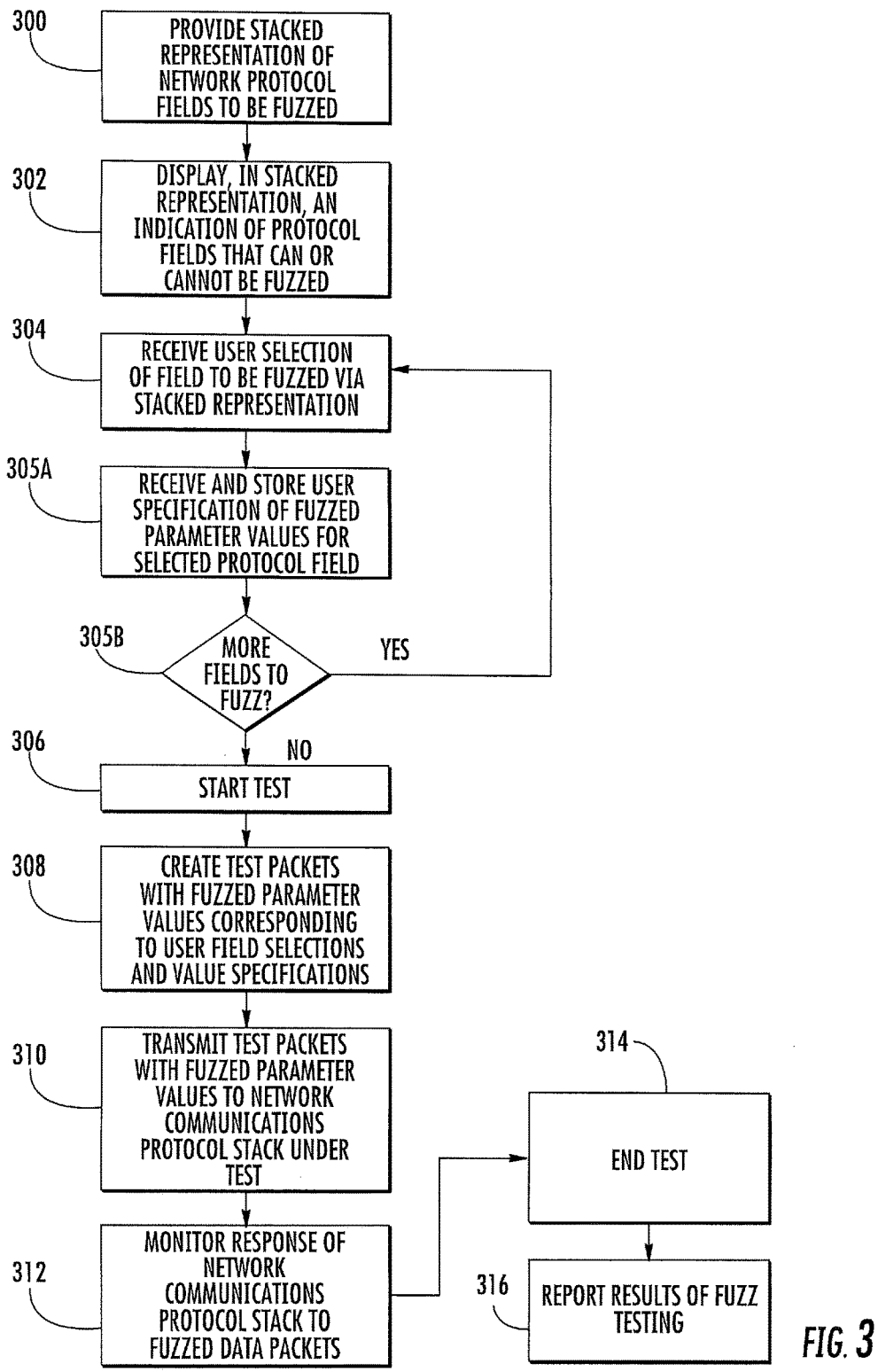
FIG. 3 is a flow chart illustrating a process for fuzz testing using a stacked representation of network protocol fields according to an embodiment of the subject matter described herein.

FIG. 3 is a flow chart illustrating an exemplary process for fuzzing using the stacked representation illustrated in FIG. 2 according to an embodiment of the subject matter described herein. Referring to FIG. 3, in step 300, a graphical user interface including a stacked representation of network protocol fields to be fuzzed is provided. For example, fuzzer GUI 116 may provide stacked representation 200 as illustrated in FIG. 2. In step 302, the fuzzer GUI displays, in the stacked representation, an indication of protocol fields that can or cannot be fuzzed. For example, fuzzer GUI 116 may display fuzzability indicators that indicate that fields can be fuzzed, that cannot be fuzzed, or both.

In step 304, user selection of a field to be fuzzed is received via the stacked representation. For example, the user may graphically select a network protocol field to be fuzzed from stacked representation 200. Because the fuzzability indicators show which fields can or cannot be fuzzed, the user is provided with a visual representation of which fields to select. The per-field fuzzing status indicators help the user to keep track of which fields have been fuzzed.

In addition, the stacked representation allows the user to easily select fields in different protocol layers for fuzzing.

Figure 4A:
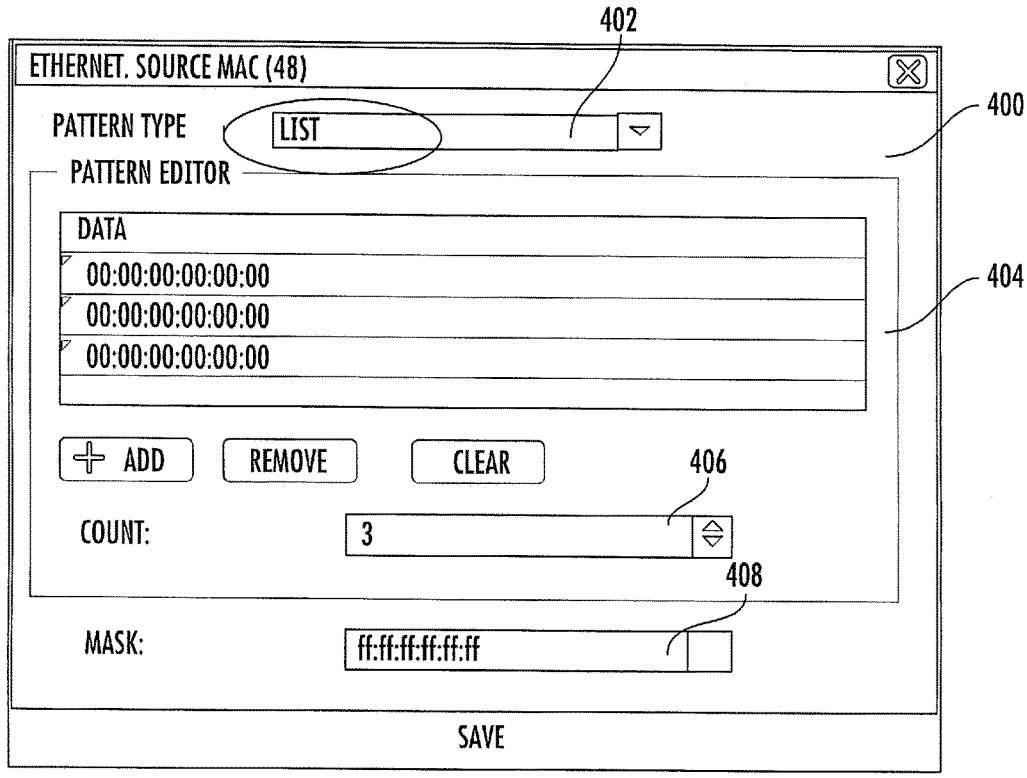
FIGS. 4A and 4B are computer screen shots illustrating examples of a pattern editor provided by the fuzzer GUI for allowing a user to define fuzzed parameter values according to an embodiment of the subject matter described herein.
Figure 4B:
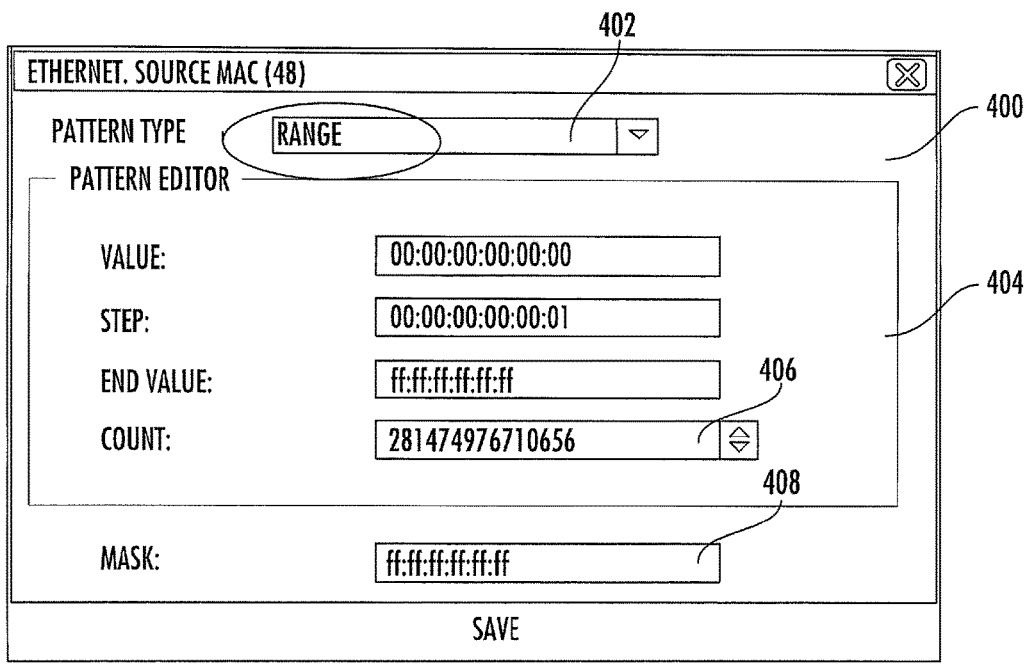

In step 305A, user specification of fuzzed parameter values for the protocol field selected to be fuzzed is received and stored. In one embodiment, fuzzer GUI 116 may instantiate a pattern editor that allows the user to define values for fuzzed protocol fields and the manner in which the fields will vary across test packets. FIGS. 4A and 4B illustrate two different examples of a pattern editor that may be provided by fuzzer GUI 116 when the user selects the source MAC address as the field to be fuzzed. Referring to FIG. 4A, a pattern editor 400 includes a pattern type menu 402 that allows the user to select how the values of the fuzzed parameter field will vary. In the illustrated example, the user has selected "List" from menu 402, indicating that the user will provide a list of fuzzed parameter values. Accordingly, a fuzzed parameter definition area 404 allows the user to define a list of fuzzed parameter values to be inserted in test packets. In the illustrated example, fuzzed parameter definition area 404 allows the user to define a list of fuzzed MAC addresses to be inserted in the source MAC address fields of test packets.

Referring to FIG. 4B, pattern editor 400 includes another option in pattern type menu 402 that allows the user to define a range of fuzzed parameter values. If the user selects "Range", fuzzed parameter definition area 404 allows the user to define a start value, an end value, and a step size for stepping through the range. Once the user defines the start value, the end value, and the step, fuzzer 114 will automatically generate fuzzed parameter values starting from the start value and proceeding through the range until the end value is reached.

In both FIGS. 4A and 4B, pattern editor 400 includes a count field 406 that displays a count of the number of fuzzed parameter values defined given the user's definition of the fuzzed parameter values. In FIG. 4A, the fuzzed parameter value list includes 3 values. Accordingly, count field 406 displays a count of 3. In FIG. 4B, the range goes from 00:00:00:00:00:00 to ff:ff:ff:ff:ff:ff with a step size of 1. Accordingly, count field 406 displays a count of 281,474, 976,710,656, which is two hundred eighty one trillion, four hundred seventy four billion, nine hundred seventy six million, seven hundred ten thousand, six hundred fifty six. The values illustrated in FIGS. 4A and 4B are shown for illustrative purposes. It is understood that in a network test, the values may be different from those illustrated in FIGS. 4A and 4B.

As illustrated in FIGS. 4A and 4B, pattern editor 400 includes a mask field 408 that allows the user to define a mask for masking the fuzzed parameter values. In both FIGS. 4A and 4B, the mask is set to ff:ff:ff:ff:ff:ff, indicating that all of the bits in the fuzzed parameter values will be inserted into the source MAC address fields of the test packets.

Once the user has defined the fuzzed parameter values using pattern editor 400, the user selects the "Save" button at the bottom of pattern editor 400 to save the fuzzed parameter field and value definitions. The fuzzed parameter fields and field values may be stored in memory 110 for subsequent access by fuzzer 114 during fuzz testing.

Returning to FIG. 3, in step 305B, it is determined whether there are more fields to fuzz. For example, after the user saves the fuzzed parameter values using the pattern editor, fuzzer GUI 116 may return to the display of stacked representation view illustrated in FIG. 2. If the user selects an additional field to fuzz using the stacked representation, control returns to steps 304 and 305A where the processes of selecting the field to be fuzzed and defining the parameter values for the field are performed. The user may repeat the process for each parameter value to be fuzzed. The appearance of pattern editor 400 may vary depending on the parameter value selected. If the user selects an unfuzzable or blocked parameter value, pattern editor 400 may not appear, and a warning message may be displayed indicating that the parameter the user has selected is unfuzzable. Once the user has defined all of the protocol fields to be fuzzed, in step 306, the user starts the test. Starting the test may include selecting a button or other mechanism provided by fuzzer GUI 116 for initiating the fuzz testing. In step 308, fuzzer 114 creates test packets with fuzzed parameter values corresponding to the selected parameters to be fuzzed and the values specified for the parameters stored in memory 110. In step 310, the fuzzed packets are transmitted to the device under test. For example, fuzzer 114 may transmit data packets with fuzzed parameter values to device under test 106 to test the functionality of protocol stack implementation 102. The purpose of transmitting fuzzed packets to device under test 106 is to assess vulnerabilities of protocol stack implementation 102 to fuzzed data packets.

In step 312, fuzzer 114 monitors the response of network protocol stack implementation 102 to determine whether a failure or transition to an invalid state has occurred. Such monitoring may be performed by receiving packets from device under test 106 and determine whether the values in received packets represent valid responses to transmitted packets according to the protocol being tested. For example, if fuzzer 114 transmits a flood of TCP SYN packets to device under test 106, then the expected response to the SYN packets may be SYN ACK packets from device under test 106 with protocol field values acknowledging the corresponding SYN packets.

In step 314, the test ends. The test may end when all of the defined fuzzed parameter values have been transmitted to the device under test, after expiration of a user-defined time period, or in response to an event, such as a failure of the device under test.

In step 316, fuzzer 114 reports results of the fuzz testing. Reporting results of the fuzz testing may include reporting failures or transitions to an invalid state of network protocol stack implementation 102. Such reporting may also include reporting fuzzed parameters that cause the failure or transition to an invalid state. For example, if an invalid response is received to a SYN packet, an indication of the invalid response, the actual response, along with the parameter values of the packet that caused the invalid response may be output.

Thus, a fuzzer GUI and a fuzzer as described herein improve technological field of network equipment testing by facilitating the creation of fuzzed data packets to be transmitted to devices under test. Using the fuzzer and fuzzer GUI described herein, a test engineer is not required to remember the names of network protocol fields, the relationship of the protocol fields to each other, or the identify of fields that can be fuzzed and that cannot be fuzzed.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for network communications protocol fuzzing, the method comprising:

in a computing device including a processor and a memory:

provide, by the processor, a fuzzer graphical user interface (GUI) including a stacked representation of individual network protocol fields to be fuzzed;

displaying, by the processor and in the fuzzer GUI, indications of the individual network protocol fields that can be fuzzed;

in response to interaction with the fuzzer GUI, changing at least one of the indications of network protocol fields that can be fuzzed to an indication of a network protocol field that cannot be fuzzed;

receiving, via the stacked representation, selections of the individual network protocol fields to be fuzzed and specifications of fuzzed parameter values for the selections;

creating test packets with fuzzed parameter values corresponding to the selections of the individual network protocol fields to be fuzzed and the specifications; and transmitting the test packets with the fuzzed parameter values to a network communications protocol stack under test.

2. The method of claim 1 wherein the stacked representation includes a two-dimensional representation of the individual network protocol fields and in which protocol layers are stacked on top of each other.

3. The method of claim 2 wherein the protocol layers correspond to implementations of open systems interconnect (OSI) protocol layers.

4. The method of claim 3 wherein the implementations of OSI protocol layers include an internet protocol (IP) protocol layer, a transmission control protocol (TCP) protocol layer, and a border gateway protocol (BGP) protocol layer.

5. The method of claim 3 wherein the protocol layers include an internet protocol (IP) protocol layer, a transmission control protocol (TCP) protocol layer, and an open shortest path first (OSPF) protocol layer.

6. The method of claim 3 wherein the stacked representation includes, for at least one of the protocol layers, a fuzzing progress indicator indicating progress of fuzzing of protocol information for the protocol layer.

7. The method of claim 1 wherein the stacked representation includes per-field fuzzing status indicators that indicate whether or not fuzzing has been enabled for a given individual network protocol field.

8. The method of claim 1 wherein the computing device comprises a network equipment test device.

9. The method of claim 1 wherein the individual network protocol fields in the stacked representation are selectable, and, when selected, invoke a pattern editor that allows specification of fuzzed parameter values for the individual network protocol fields.

10. The method of claim 9 wherein the pattern editor is configured to allow specification of a manner in which the fuzzed parameter values will vary.

11. A system for network communications protocol fuzzing, the system comprising:

a computing device including a processor and a memory;

a fuzzer graphical user interface (GUI), stored in the memory and executed by the processor, for displaying a stacked representation of individual network protocol fields to be fuzzed, the stacked representation including indications of the individual network protocol fields that can be fuzzed, in response to interaction with the fuzzer GUI, changing at least one of the indications of network protocol fields that can be fuzzed to an indication of a network protocol field that cannot be fuzzed, receiving, via the stacked representation, selections of the individual network protocol fields to be fuzzed and specifications of fuzzed parameter values for the selections; and a fuzzer, stored in the memory and executed by the processor, for creating test packets with fuzzed parameter values corresponding to the selections of the individual network protocol fields to be fuzzed and the specifications and transmitting the test packets with the fuzzed parameter values to a network communications protocol stack under test.

12. The system of claim 11 wherein the stacked representation includes a two-dimensional representation of the individual network protocol fields and in which protocol layers are stacked on top of each other.

13. The system of claim 12 wherein the protocol layers correspond to implementations of open systems interconnect (OSI) protocol layers.

14. The system of claim 13 wherein the implementations of OSI protocol layers include an internet protocol (IP) protocol layer, a transmission control protocol (TCP) protocol layer, and a border gateway protocol (BGP) protocol layer.

15. The system of claim 13 wherein the implementations of OSI protocol layers include an internet protocol (IP) protocol layer, a transmission control protocol (TCP) protocol layer, and an open shortest path first (OSPF) protocol layer.

16. The system of claim 13 wherein the stacked representation includes, for at least one of the protocol layers, a fuzzing progress indicator indicating progress of fuzzing of protocol information for the protocol layer.

17. The system of claim 13 wherein the stacked representation includes per-field fuzzing status indicators that indicate whether or not fuzzing has been enabled for a given individual network protocol field.

18. The system of claim 11 wherein the computing device comprises a network equipment test device.

19. The system of claim 11 wherein the individual network protocol fields in the stacked representation are selectable, and, when selected, invoke a pattern editor that allows specification of fuzzed parameter values for the individual network protocol fields.

20. The system of claim 19 wherein the pattern editor is configured to allow specification of a manner in which the fuzzed parameters will vary.

21. A non-transitory computer readable medium having stored thereon executable instructions that when executed by the processor of a computer control the computer to perform steps comprising:

in a computing device including a processor and a memory:

providing, by the processor, a fuzzer graphical user interface (GUI) including a stacked representation of individual network protocol fields to be fuzzed;

displaying, by the processor and in the fuzzer GUI, indications of the individual network protocol fields that can be fuzzed;

in response to interaction with the fuzzer GUI, changing at least one of the indications of network protocol fields that can be fuzzed to an indication of a network protocol field that cannot be fuzzed;

receiving, via the stacked representation, selections of the individual network protocol fields to be fuzzed and specifications of fuzzed parameter values for the selections;

creating test packets with fuzzed parameter values corresponding to the selections of the individual network protocol fields to be fuzzed and the specifications; and transmitting the test packets with the fuzzed parameter values to a network communications protocol stack under test.

* * * * *